(12) United States Patent
Ross

(10) Patent No.: US 6,941,449 B2
(45) Date of Patent: Sep. 6, 2005

(54) METHOD AND APPARATUS FOR PERFORMING CRITICAL TASKS USING SPECULATIVE OPERATIONS

(75) Inventor: Jonathan K. Ross, Woodinville, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 504 days.

(21) Appl. No.: 10/092,093

(22) Filed: Mar. 4, 2002

(65) Prior Publication Data
US 2003/0167292 A1 Sep. 4, 2003

(51) Int. Cl.[7] .............................................. G06F 9/312
(52) U.S. Cl. ........................................................ 712/35
(58) Field of Search .................................. 712/35, 235

(56) References Cited

U.S. PATENT DOCUMENTS

| | | | | |
|---|---|---|---|---|
| 5,664,137 A | * | 9/1997 | Abramson et al. | 712/216 |
| 5,751,983 A | * | 5/1998 | Abramson et al. | 712/216 |
| 5,915,117 A | * | 6/1999 | Ross et al. | 710/262 |
| 6,021,485 A | * | 2/2000 | Feiste et al. | 712/216 |
| 6,032,244 A | * | 2/2000 | Moudgill | 712/23 |
| 6,370,639 B1 | * | 4/2002 | Huck et al. | 712/222 |
| 6,631,460 B1 | * | 10/2003 | Morris et al. | 712/217 |

* cited by examiner

*Primary Examiner*—Eric Coleman

(57) ABSTRACT

Method and apparatus for performing a critical task using a load that is speculative. Specifically, a method of computation for performing critical tasks with speculative operations is described in one embodiment. The critical task is performed to achieve a first result while a condition of a processor used to perform said critical task is unknown. In parallel, the condition of the processor is determined. If the condition is as expected, then the first result is committed. If the condition is not as expected, then the condition is fixed to be as expected. The first result benignly fails. Also, the critical task is re-performed using the operation that is speculative resulting in a second result. The second result is then committed.

27 Claims, 4 Drawing Sheets

METHOD AND APPARATUS FOR PERFORMING CRITICAL TASKS USING SPECULATIVE OPERATIONS

TECHNICAL FIELD

The present invention relates generally to performing critical tasks using speculative loads.

BACKGROUND ART

Static speculation techniques have been used to allow a compiler, or an application, to schedule a load (speculative load) before it is known that the reference is needed. For example, the speculative load may be scheduled when the compiler, that is associated with hardware, has good information to suggest that the load value is likely to be used, but the compiler does not have the necessary information to indicate the load value would necessarily be used. In these schemes, the hardware does not raise any exceptions visible to the instruction stream containing the speculative load.

When it is determined that the results of the speculative load are needed, the compiler can check the exception indicator to see if the speculative load caused an exception. In the case where an exception is generated, the compiler can invoke some mechanism to re-execute the load instruction, and potentially re-execute any other instructions that were speculatively computed based on the value speculatively loaded.

As such, speculative loads enable compilers to generate references to unqualified addresses. The load addresses are protected by the virtual memory system, that is, only memory for current processes are readable. More particularly, virtual translations to memory mapped Input/Output (I/O) locations are marked with a unique memory attribute in a Translation Lookaside Buffer (TLB). This attribute indicates that the memory location is "unsafe" for speculation. As such, the attribute indicates that there may be side-effects to reading from or writing to these locations. In other instances, the attribute indicates that addresses in a virtual memory mapped I/O page may not respond to reads or writes.

Because of the "unsafe" nature of referencing memory mapped I/O addresses in a speculative manner, a speculative load is defined to abort a load to an address with an I/O TLB attribute and set the deferred exception indicator. For physical speculative loads (loads when data translation is disabled) there is no TLB to query for a memory attribute. In that case, the processor behaves as if the target of a physical speculative load is "unsafe", aborts the load and sets the deferred exception indicator.

Software execution at the interrupt handler has an increasing role in emulating or monitoring instruction execution. Instruction emulation may occur for a number of reasons, ranging from executing new instructions on an old version of a processor, to virtualizing a processor and emulating privileged instructions, etc. Instruction monitoring may be done to assist in debugging an operation environment or for performance characterization.

Previously, speculative loads were not used in the context of qualified addresses. For example, the memory address referenced by an interruption handler is known to be a valid virtual memory address, such as, when the interruption handler is storing information into a known virtual address. As such, the virtual memory address is not unqualified. In some first-level interruption handlers, speculative loads would defer all exceptions without causing an interruption. References to virtual memory by the interruption handler are deferred until it is known that all the expected conditions of virtual memory exist, such as, when data translation is enabled. Such is the case, for example, when performing performance profiling and characterization of an application.

Memory translation settings in some low level interruption handlers are unchanged from the interrupted context. For example, if data translation is enabled in the interrupted context, it will be enabled in the interruption handling context as well. Low-level interruption handlers for emulation or monitoring functions can be invoked when data translation is enabled or disabled.

However, if data translation is disabled, the interruption handler could access physical memory addresses that could cause an application to abort or the system to fail. For example, accessing Input/Output (I/O) locations may cause side-effects from reading from or writing to these locations. These side-effects could be so severe as to cause system failure.

Prior Art FIG. 1 is a flow chart 100 illustrating steps in a method for accessing memory addresses when the conditions of virtual memory are unknown, such as whether data translation is enabled. The process in flow chart 100 defers execution until the status of virtual memory is determined.

In flow diagram 100, an interrupt is received, for example, by a low-level interruption handler, and load instructions are processed for execution. In step 110, the interruption handler checks the status of virtual memory 110. This is necessary to ensure that the addresses referenced by the load instructions are translated into virtual addresses.

In step 120, the interruption handler determines if the data translation for translating the virtual memory is enabled. If data translation is enabled, then the interruption handler can correctly access the virtual memory addresses, and the compiler continues the mainline code to begin executing the critical task as defined by the load instructions, in step 140.

On the other hand, if data translation of the virtual memory is not enabled, then the interruption handler sets the expected preconditions in virtual memory, for example, enabling data translation, in step 130. Thereafter, the interruption handler returns to the mainline code to begin executing the critical task as defined by the load instructions, in step 140. In step 150, the return results from the executed load operation are committed (e.g., written to memory).

Because of the relatively large time expense of checking the status of the virtual memory, an unfortunate performance penalty is realized by checking and enabling data translation before performing the real task of the interruption handler. This performance sacrifice is especially pronounced when ensuring and enabling data translation upon entry of an interruption handler in the areas of software instruction emulation or the monitoring of instruction execution.

DISCLOSURE OF THE INVENTION

Embodiments of the present invention describe a method and apparatus for performing a critical task using an operation that is speculative. Specifically, a method of computation for performing critical tasks with speculative operations is described in one embodiment. The critical task is performed to achieve a first result while a condition of a processor used to perform said critical task is unknown. In parallel, the condition of the processor is determined. If the condition is as expected, then the first result is committed. If the condition is not as expected, then the condition is fixed to be as expected. The first result benignly fails. Also, the critical task is re-performed using the load that is speculative resulting in a second result. The second result is then committed.

BRIEF DESCRIPTION OF THE DRAWINGS

The above and other objects and advantages of the present invention will be more readily appreciated from the following detailed description when read in conjunction with the accompanying drawing, wherein.

PRIOR ART

Figure 1:
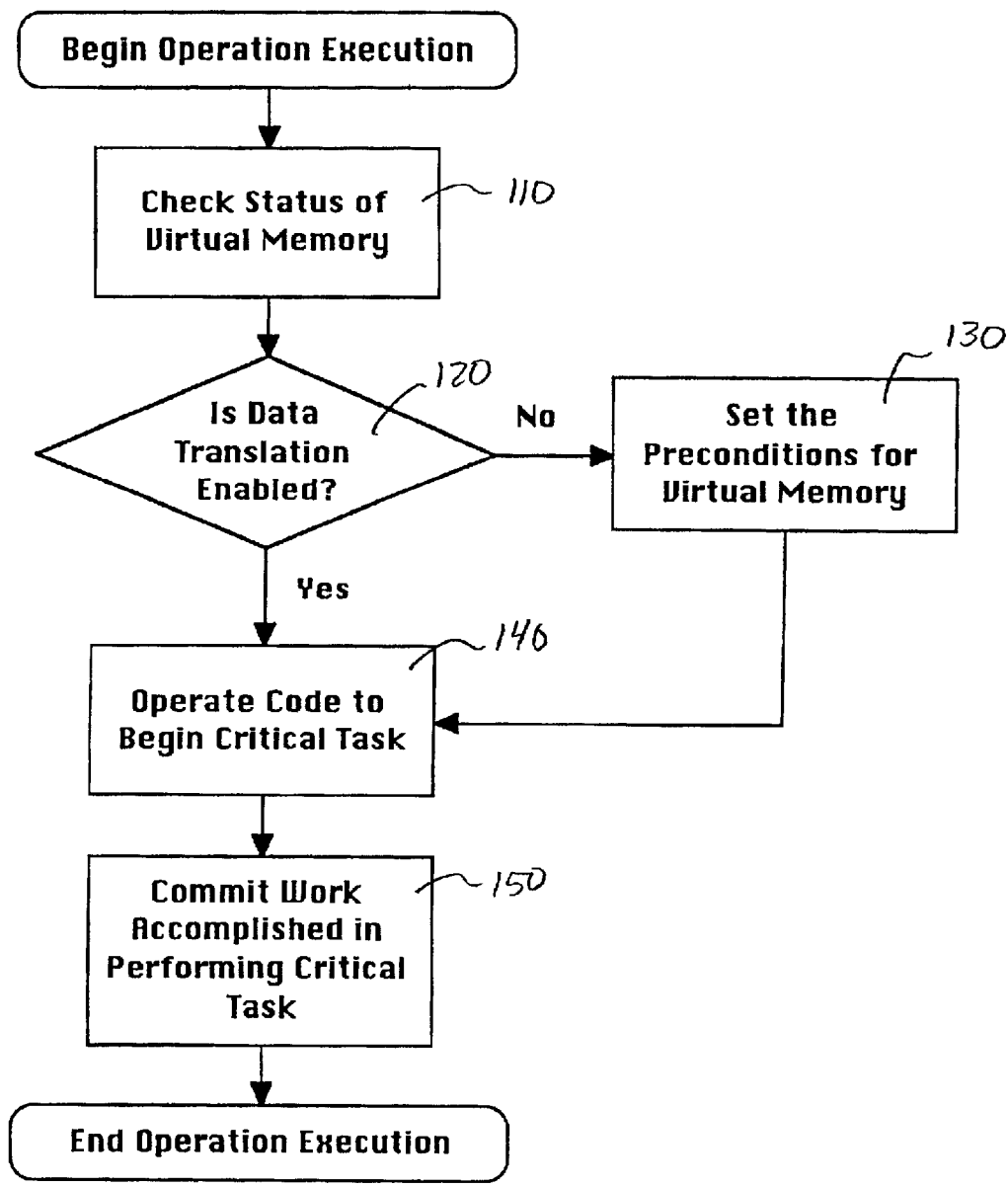
FIG. 1 is a flow chart illustrating steps in a method of accessing unqualified addresses for load execution.

The drawings referred to in this description should be understood as not being drawn to scale except if specifically noted.

BEST MODES FOR CARRYING OUT THE INVENTION

Reference will now be made in detail to embodiments of the present invention, a method for performing critical tasks using speculative loads, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," or "accessing," or "committing," or "fixing," or "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, the present invention provides a method and system for performing critical tasks using speculative operations. Embodiments of the present invention are described generally in an environment where code sequences perform critical tasks. Other embodiments of the present invention are well suited to code sequences for handling critical tasks for low-level and lightweight interrupt handlers, higher level interrupt handlers, compilers, and applications, that implement a method for performing critical tasks using speculative operations.

Also, embodiments of the present invention are described where code sequences using speculative operations to perform critical tasks. More specifically, other embodiments of the present invention are well suited to code sequences using loads that are speculative to perform critical tasks.

Further, some embodiments of the present invention are implemented on computer-readable and computer-executable instructions which reside, for example, in computer-readable media of a computer system.

Figure 2:
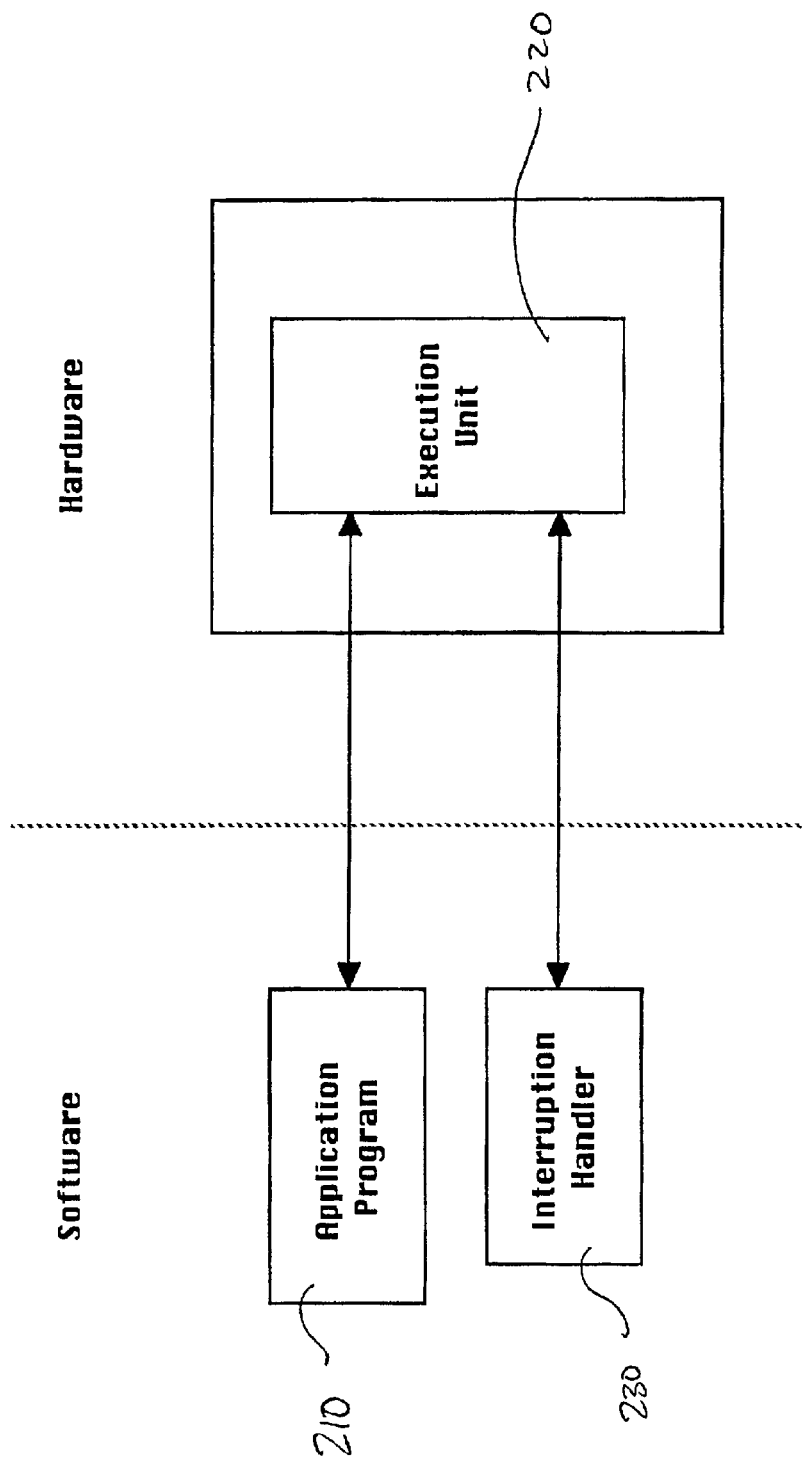
FIG. 2 is a block diagram of a system that is capable of implementing a method of performing critical tasks using speculative loads, in accordance with one embodiment of the present invention.
Figure 3:
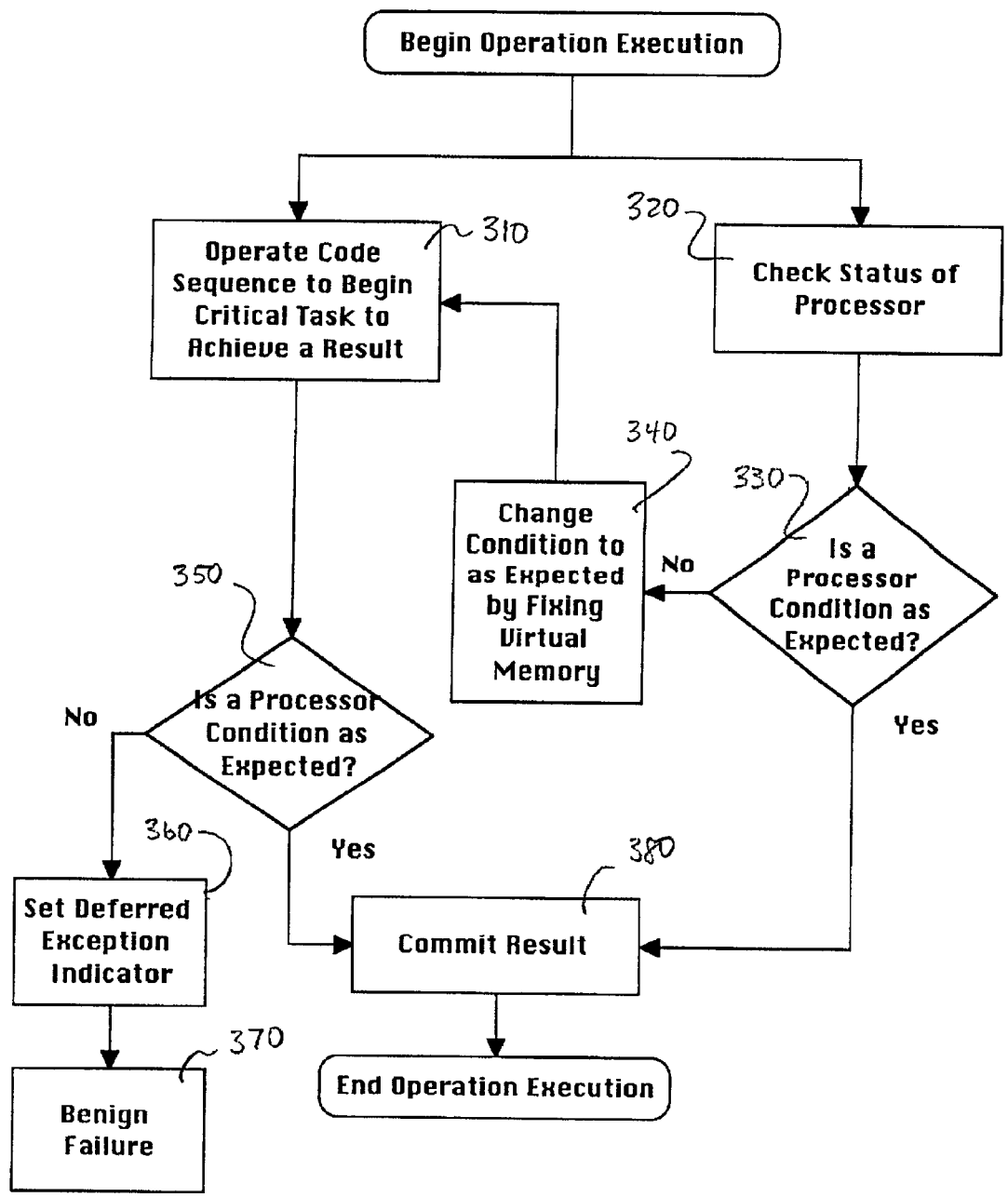
FIG. 3 is a flow diagram illustrating steps in a method for performing critical tasks using speculative loads, in accordance with one embodiment of the present invention.
Figure 4:
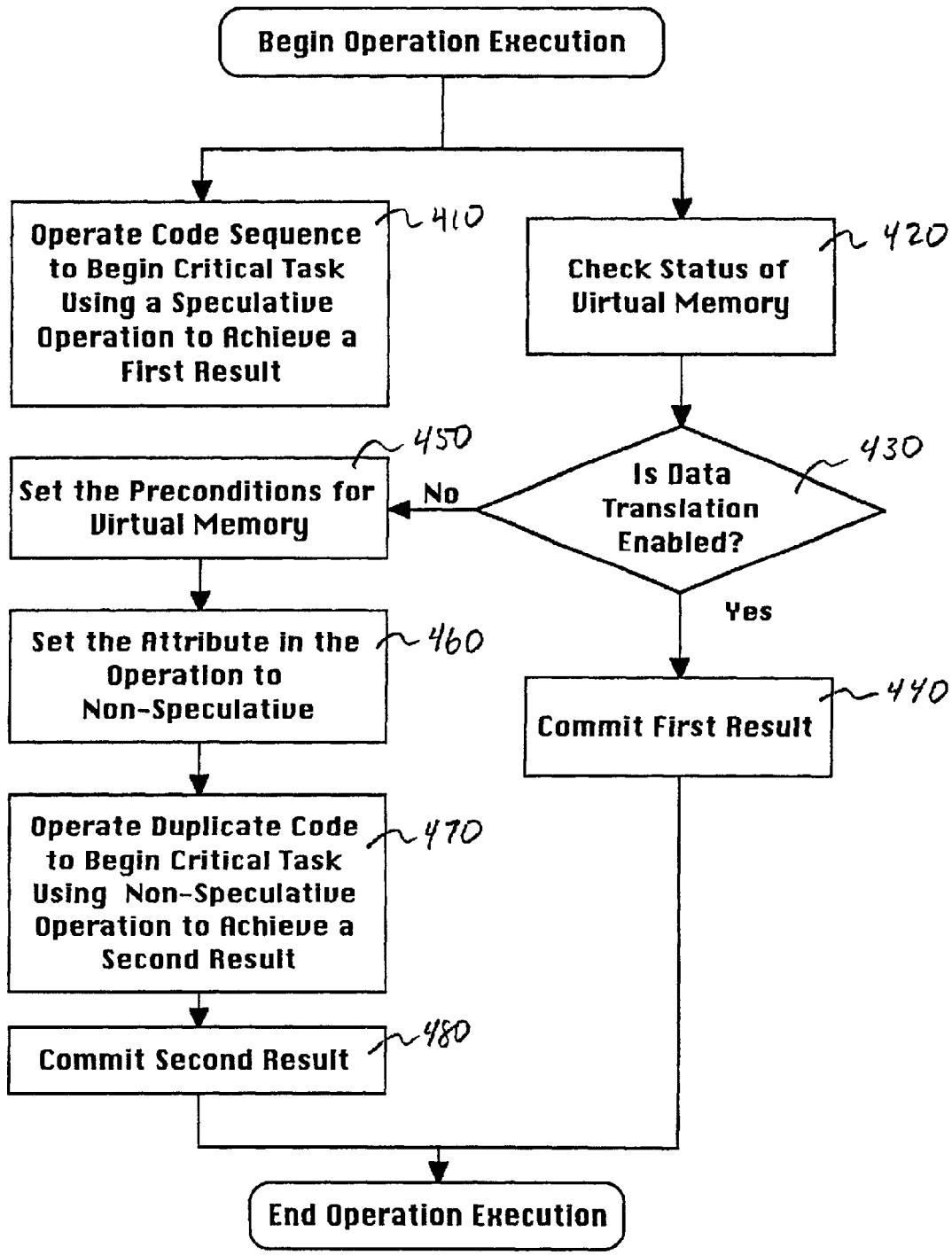
FIG. 4 is a flow diagram illustrating steps in a method for performing critical tasks using speculative load, in accordance with one embodiment of the present invention.

FIG. 2 is a block diagram of a system 200 capable of implementing the method illustrated in the flow charts of FIGS. 3 and 4, in accordance with one embodiment of the present invention. The system 200 has sufficient hardware (e.g., processor, memory, display, etc.) to implement performance of critical tasks using speculative operations, in accordance with one embodiment of the present invention. As discussed previously, other embodiments have sufficient hardware to implement performance of critical tasks using speculative loads.

The system 200, generates an interrupt from an application program 210 located on the software side of the system 200, in accordance with one embodiment of the present invention. The interrupt is received at an execution unit 220 within the hardware side of the system 200. The processor located in the execution unit suspends its current operations and transfers control over to a special routine known as an interrupt handler 230. The interrupt handler 230 contains the code sequence, program, operation or load instructions for execution as determined and indicated by the interrupt. Other embodiments are well suited to code sequences for performing critical tasks contained within the main body of a code.

Normally, if the operation instructions executed by a processor (e.g., unit 220) are accessing memory addresses without data translation enabled, the operation instructions may not execute in order to protect the memory subsystem. For example, a operation instructions for an interrupt handler may not execute in order to protect the memory subsystem. Alternatively, if the processor handling the execution of the operation instructions was able to access the memory addresses without data translation enabled, system failure is quite possible. However, speculative features used to access virtual memory addresses allow for access to the virtual memory addresses while guaranteeing that system failure will not occur or that the application generating the interrupt will not abort, in accordance with one embodiment of the present invention.

Although embodiments of the present invention are described using speculative operations (e.g., speculative loads) while the state or status of data translation is unknown, other embodiments are well suited to performing speculative operations while conditions of a processor are unknown (e.g., status of data translation). Also, other embodiments are well suited to performing speculative operations in an interrupt handler while conditions of a processor are unknown. Still other embodiments are utilized at all levels of interrupt handlers (e.g., low level interrupt handler, high level interrupt handler, etc.).

Embodiments of the present invention are well suited to implementations of code sequence execution in an interrupt handler within the context of tracing, performance profiling of an application, or performance characterization of an application within an operating system, and the like. Other embodiments are well suited to execution of low level machine code sequences (e.g., assembly language) to perform critical tasks, such as tracing, performance profiling of an application, or performance characterization of an application within an operating system, and the like.

One embodiment of the present invention is implemented in an environment where a critical task is called for execution. Also, the critical task accesses virtual memory locations that are valid and well known, in other words, they can be qualified addresses. Normally, most applications and operating systems operate with virtual memory enabled to provide memory subsystem protection. As such, data translation can be enabled to provide memory subsystem protection.

However, should data translation be disabled, haphazard storage and access into those valid virtual memory addresses could cause an abort of the application that generates the interrupt, and/or system failure. In addition, checking the status of virtual memory or data translation each time the interrupt is called can be a time consuming process when implemented in a serial manner as discussed in accordance with Prior Art FIG. 1. In essence, the critical path is not executed until the status of virtual memory is determined. This is especially true in a low-level and lightweight interrupt handler environment where the critical task is performed infrequently. By serially checking for the status of virtual memory, or data translation each time the critical task is called, significant performance degradation occurs.

In one embodiment, static speculation techniques are used in an environment that has not heretofore implemented speculation features. The static speculation techniques are used to prevent system and application failure when handling interrupts without knowing a condition or conditions of a processor (e.g., whether data translation is enabled) that is associated with the interrupt handler. In one embodiment, the processor executing a code sequence for a critical task sets the attribute within the operation to indicate a speculative operations. Specifically, in one embodiment, an interrupt handler executing the code sequence to perform a critical task sets an attribute within a load to indicate a speculative load. Thereafter, the processor implements speculative features of the operating system when handling that speculative operation. For example, if later a "defer exception indicator" is associated with that operation, then all processes that result from that speculative operation will benignly fail without doing any harm to the processor and the application generating the interrupt. More importantly, the system containing the processor will not fail, and the application will not abort.

FIG. 3 is a flow chart 300 illustrating steps in a method for performing critical tasks using speculative operations, in accordance with one embodiment of the present invention. The present embodiment provides for a method of computation that allows for the performance of a critical task using a speculative operation. Performance of the critical task is performed while a condition of a processor (e.g., the enablement state of virtual memory) is unknown. In one embodiment, a method of computation that allows for the performance of a critical task using a speculative load is envisioned. In another embodiment, a method of computation that allows for the performance of a critical task using a speculative operation or load in an interrupt handler is envisioned.

The present embodiment allows a processor to begin its critical task immediately upon entry, while checking in parallel for unusual conditions (e.g., whether data translation is enabled or disabled). For example, in one embodiment an interrupt handler can begin its critical task immediately upon entry, while checking in parallel for unusual conditions. Flow chart 300 in FIG. 3 illustrates the parallel processing performed by the processor. In step 310, the processor operates the code sequence to begin the critical task as called for by the operation instruction. Performance of the critical task achieves a result that is not committed at this time.

The use of speculative operations in step 310 to perform a critical task protects the system from performing incorrect physical mode references, in accordance with one embodiment of the present invention. As such, performance of the critical task can be performed immediately upon entry. In one embodiment, when data translation is disabled, a non-speculative attribute is associated with memory addresses. References to memory are done with speculative loads. Protection is enabled, since truly speculative operations remain benign and will not corrupt undefined parts of the physical and virtual memory system. In one embodiment, a "load speculation" (e.g., "ld.s") instruction satisfies the aforementioned requirements. Normally a ld.s instruction is used before it is known that a memory reference will be required. However, in the present embodiment, the memory reference is required, and is known to be valid.

More particularly, speculative operations can be used to protect operations which are not "control speculative," in that, the operations necessarily will be executed. In the present embodiment, it is assumed that the operations performed are required. In a sense, the operation instructions are not control speculative. However, it is unclear whether all the pre-conditions of the environment when executing the operation are satisfied (e.g., data translation is enabled). As such, by defining the operations as speculative, the speculative operations can be used to protect the memory subsystem. For example, since the critical task utilizes speculative operations, if the conditions are not as expected, return results from the execution of that operation would not pollute the cache or memory subsystem.

Returning back to flow chart 300, at the same time and in parallel with step 310, the processor executing the code sequence to perform the critical task checks the unusual condition. The present embodiment determines if a condition of the processor is as expected, in step 320. In one embodiment, the processor is determining whether the virtual memory or data translation is enabled or disabled. In another embodiment, if a interrupt handler is executing the code sequence, the interrupt handler determines whether the virtual memory or data translation is enabled or disabled. In that case, an expected condition indicates that data translation is enabled, and an unexpected condition indicates that data translation is disabled.

If the present embodiment determines that the condition is as expected (e.g., data translation enabled), as normally would be the case, then the present embodiment commits the return result derived from execution of the critical task in step 380. As such, return results from the operation are committed (e.g., written to memory). A performance gain is realized, since the time consuming process of checking the status of data translation is performed in parallel with execution of the operation.

On the other hand, if the present embodiment, in the rare case, determines that the condition of the processor is not as expected (e.g., data translation is disabled) in step 330, then the compensating code is executed to handle the anomaly. The present embodiment proceeds to step 340 to fix the condition to be as expected. In one embodiment, the preconditions will be set in virtual memory, for example, virtual memory and data translation will be enabled.

Thereafter, the present embodiment returns to the beginning of the code sequence handled by the processor and re-executes or re-operates the programming code to begin the critical task in step 310. The operation is still speculative, as previously designated; however, since the preconditions are set as expected within virtual memory, the operation will execute successfully without generating a deferred exception indicator. As such, the speculative operation will not defer, allowing for a continuation of the critical code sequence.

At this point, the present embodiment proceeds to decision step 350 to continue processing the result generated from the re-execution of the critical task. The present embodiment determines if the conditions of the processor are as expected (e.g., virtual memory and data translation are enabled), in step 350. Within the return result of performing the critical task, information is included that indicates whether the condition is as expected. For example, in one embodiment, the information indicates whether data translation is enabled or disabled.

If the condition of the processor is not as expected (e.g., data translation is disabled), the present embodiment sets the deferred exception indicator in step 360, and all returns associated with the speculative operation will benignly fail in step 370. Since speculative operations and speculative features were utilized in executing the critical task, no harm will affect the system or application calling for execution of the critical task.

On the other hand, if the condition of the processor is as expected (e.g., virtual memory and data translation is enabled), then the present embodiment proceeds to step 380 and commits the return result derived from executing the critical task. As such, return results from the operation are committed (e.g., written to memory).

Therefore, a slight performance penalty is incurred in the rare case when data translation is disabled, by having to set the preconditions to enable data translation. However, the slight performance penalty is welcomed since it rarely occurs, primarily because the preconditions are usually set to enable data translation in order to protect the memory subsystem. The performance penalty is even less noticeable in a lightweight interrupt handler environment. In either case, the slight performance penalty pales in comparison to the benefit gained when checking the status checks of virtual memory in parallel. Additionally, the performance penalty is slight in comparison to a system failure when accessing unqualified memory addresses.

FIG. 4 is a flow chart 400 illustrating steps in a method for performing critical tasks using speculative operations, in accordance with another embodiment of the present invention. The present embodiment provides for a method of computation that allows for the performance of a critical task using a speculative operation. Performance of the critical task is performed while a condition of the processor is unknown. For example, in other embodiments, performance of the critical task is performed while a condition of virtual memory is unknown; more specifically, whether data translation is enabled or disabled. Other embodiments of the present invention as described in FIG. 4 are well suited to providing a method of computation for the performance of a critical task using a speculative load. In other embodiments, a method of computation that allows for the performance of a critical task using a speculative operation or load in an interrupt handler is envisioned.

The present embodiment is implemented in an environment where a critical task is called for execution. Also, the critical task accesses virtual memory locations for operations that are definitely needed.

The present embodiment allows an processor to begin its critical task immediately upon entry, while checking in parallel for unusual conditions. Flow chart 400 in FIG. 4 illustrates the parallel processing performed by the processor. In step 410, the interrupt handler operates the code sequence to begin the critical task as called for by the operation instruction. Performance of the critical task achieves a first result that is not committed.

The use of speculative operations in step 410 to perform a critical task protects the system from performing incorrect physical mode references, in accordance with one embodiment of the present invention. In one embodiment, when data translation is disabled, a non-speculative attribute is associated with memory addresses. References to memory are done with speculative loads. Protection is enabled, since truly speculative operations remain benign and will not corrupt undefined parts of the physical and virtual memory system. In one embodiment, a "load speculation" (e.g., "ld.s") instruction satisfies the aforementioned requirements. Normally a ld.s instruction is used before it is known that a memory reference will be required. As such, since the critical task utilizes speculative operations, if the conditions are not as expected, results from the execution of that operation would not pollute the cache or memory subsystem.

At the same time and in parallel with step 410, the processor checks the unusual condition, in this case, the status of virtual memory in step 420. More specifically, the present embodiment determines if data translation is enabled in decision block 430.

If the present embodiment determines that data translation is enabled, as normally would be the case, then the present embodiment commits the first result, in step 440. As such, return results from the operation are committed (e.g., written to memory). A performance gain is realized, since the time consuming process of checking the status of data translation is performed in parallel with load execution.

On the other hand, if the present embodiment, in the rare case, determines that data translation was disabled in step 430, then the compensating code is executed to handle the anomaly. The present embodiment proceeds to step 450 to set the preconditions for virtual memory. In one embodiment, the preconditions are set to what is commonly expected. Setting the preconditions also enables data translation.

Thereafter, the present embodiment re-executes the critical task this time with data translation enabled. However, this time, the attribute for the operation is set to indicate a non-speculative operation, since all the preconditions are as expected (e.g., data translation is enabled) which would result in successful execution of the operation, in step 460.

The present embodiment does not return to the beginning of the code sequence handled by the processor in step 410. Instead, the present embodiment re-executes the critical task using duplicate code handled by the processor to achieve a second result, in step 470. The duplicate code is copied from the code used initially to execute the critical task in step 410, and stored in memory.

Performance of the critical task achieves a second result that is committed in step 480. As such, return results from the operation, as re-executed, are committed (e.g., written to memory).

Therefore, a slight performance penalty is incurred in the rare case when data translation is disabled, by having to set the preconditions to enable data translation. Again, the slight performance penalty is welcomed since it rarely occurs, primarily because the preconditions are usually set to enable data translation in order to protect the memory subsystem. Further, the performance penalty is even less noticeable in a lightweight interrupt handler environment. In either case, the slight performance penalty pales in comparison to the benefit gained when checking the status checks of virtual memory in parallel. Additionally, the performance penalty is slight in comparison to a system failure when accessing unqualified memory addresses.

Below is a listing of pseudo code that can be used for performing critical task using speculative operations, and more specifically, a speculative load, in accordance with one embodiment of the present invention. It is appreciated that the listed pseudo code is exemplary only and that other alternatives are available. The example should not be construed as limiting the scope of the invention to any particular computer language or subroutine architecture or structure.

```
// Start our real work right away
        movl        r29 = __handler_data_address
;;
        ld8.s       r28 = [r29]
        mov         r31 = cr.ipsr
// read psr while we wait for data from cache
;;
        add         r28 = r28, 16
;;
        ld8.s       r27 = [r28]     // continue computing
        // Sometime later, before we commit our work, check to see
if loads worked
        tbit.z p1 = r31, PSR_DT_BIT_POSITION
        //is data translation off?
(p1)    br          fixup-label:
        // yes, it was so go fix it
reenter:
// Now we can commit our work
. . .
// End of handler
// some disjoint code location
fixup-label:
        ssm PSR DT                  // if it was off turn it on
;;
```

-continued

```
        srlz.d      // make sure the change takes effect
// here we redo the loads done so-far in the handler
        br          reenter         // branch back to main code path
```

In another embodiment, a speculative load in a first-level interruption handler can be used for physical references without generating an interruption, although the non-faulting behavior is commonly used to allow non-faulting virtual references in first-level handlers.

While the methods of embodiments illustrated in flow charts 300 and 400 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

A method and apparatus for performing critical tasks using speculative operations is thus described. While the present invention has been described in particular embodiments, it should be appreciated that the present invention should not be construed as limited by such embodiments, but rather construed according to the below claims.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A method of computation comprising:
   a) performing a critical task using an operation that is speculative while a condition of a processor used for performing said critical task is unknown;
   b) in parallel with a), determining said condition;
   c) if said condition is as expected, committing a first result from said performing said critical task; and
   d) if said condition is not as expected, allowing said first result to benignly fail, changing said condition to be as expected by setting preconditions in virtual memory, re-performing said critical task using said operation, and committing a second result from said re-performing said critical task.

2. The method of computation as described in claim 1, wherein said operation is a load.

3. The method of computation as described in claim 1, wherein a) further comprises:
   assigning a speculative attribute to said operation.

4. The method of computation as described in claim 1, wherein said condition is an enablement state of said virtual memory.

5. The method of computation as described in claim 4, wherein b) comprises:
   determining, in parallel to a), if data translation is enabled, wherein when data translation is enabled said condition is as expected, and when data translation is disabled said condition is not as expected.

6. The method of computation as described in claim 1, wherein a) further comprises:
   receiving an interruption at an interruption handler to perform said critical task.

7. The method of computation as described in claim 6, wherein said interruption handler is a first-level interruption handler operating in a lightweight interruption environment.

8. The method of computation as described in claim 1, wherein c) further comprises:

storing said first result in a virtual memory address; and wherein d) further comprises:

storing said second result in said virtual memory address.

9. The method of computation as described in claim 1, wherein d) further comprises:

assigning a non-speculative attribute to said operation, duplicating code used to execute a) forming a duplicated code, and re-performing said critical task using said duplicated code.

10. A method of computation comprising:

a) receiving an interruption from an application to perform a critical task; and b) incorporating speculative features of a processor to perform said critical task, that references virtual memory addresses that are known and valid, but a condition of a processor used for performing said critical task is unknown; and c) using a speculative load to perform said critical task, and wherein c) further comprises:

c1) performing said critical task;

c2) in parallel with c1) determining said condition;

c3) if said condition is as expected by determining virtual memory is enabled, committing a first result from said performing said critical task; and c4) if said condition is not as expected by determining virtual memory is disabled, changing said condition to be as expected, and re-performing said critical task successfully while allowing said first result to benignly fail.

11. The method of computation as described in claim 10, wherein c4) further comprises:

committing a second result from said re-performing said critical task.

12. The method of computation as described in claim 10, wherein said interruption is handled by an interrupt handler.

13. A method of computation comprising:

a) receiving an interruption from an application to perform a critical task;

b) performing said critical task using a load that is speculative while a condition of virtual memory is unknown;

c) in parallel with b), determining said condition;

d) if virtual memory is enabled, committing a first result from said performing said critical task;

e) if virtual memory is disabled, enabling said virtual memory in order to re-perform said critical task successfully while allowing said first result to benignly fail since said load is speculative.

14. The method of computation as described in claim 13, wherein e) further comprises:

e2) re-performing said critical task using said load; and e3) committing a second result from said re-performing said critical task.

15. The method of computation as described in claim 13, wherein a) further comprises:

assigning a speculative attribute to said load.

16. The method of computation as described in claim 13, wherein an interruption handler receives said interruption and performs said critical task.

17. The method of computation as described in claim 13, wherein said interruption handler operates in a lightweight interruption environment.

18. The method of computation as described in claim 13, wherein d) further comprises:

d1) assigning a non-speculative attribute to said load, forming a non-speculative load;

d2) duplicating code used to execute b), forming a duplicated code; and d3) re-performing said critical task with said duplicated code using said non-speculative load.

19. A computer system comprising:

a processor; and a computer readable memory coupled to said processor and containing program instructions that, when executed, implement a method of computation comprising:

a) performing a critical task using an operation that is speculative while a condition of a processor used for performing said critical task is unknown;

b) in parallel with a), determining said condition;

c) if said condition is as expected, committing a first result from said performing said critical task; and d) if said condition is not as expected, allowing said first result to benignly fail, changing said condition to be as expected by setting preconditions in virtual memory, re-performing said critical task using said operation, and committing a second result from said re-performing said critical task.

20. The computer system as described in claim 19, wherein said operation is a load.

21. The computer system as described in claim 19, wherein a) in said method further comprises:

assigning a speculative attribute to said operation.

22. The computer system as described in claim 19, wherein said condition is an enablement state of said virtual memory.

23. The computer system as described in claim 22, wherein b) in said method comprises:

determining, in parallel to a), if data translation is enabled, wherein when data translation is enabled said condition is as expected, and when data translation is disabled said condition is not as expected.

24. The computer system as described in claim 19, wherein a) in said method further comprises:

receiving an interruption at an interruption handler to perform said critical task.

25. The computer system as described in claim 24, wherein said interruption handler is a first-level interruption handler operating in a lightweight interruption environment.

26. The computer system as described in claim 19, wherein c) in said method further comprises:

storing said first result in a virtual memory address; and wherein d) further comprises:

storing said second result in said virtual memory address.

27. The computer system as described in claim 19, wherein d) in said method further comprises:

assigning a non-speculative attribute to said operation, duplicating code used to execute a) forming a duplicated code, and re-performing said critical task using said duplicated code.

* * * * *